(12) United States Patent
Tsuchiya et al.

(10) Patent No.: US 7,251,933 B2
(45) Date of Patent: Aug. 7, 2007

(54) FLOW RATE CONTROL DEVICE FOR POWER STEERING

(75) Inventors: Hideki Tsuchiya, Tokyo (JP); Yoshiharu Miya, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 120 days.

(21) Appl. No.: 10/504,060

(22) PCT Filed: Mar. 4, 2003

(86) PCT No.: PCT/JP03/02483

§ 371 (c)(1),
(2), (4) Date: Apr. 18, 2005

(87) PCT Pub. No.: WO03/076252

PCT Pub. Date: Sep. 18, 2003

(65) Prior Publication Data

US 2006/0150808 A1    Jul. 13, 2006

(30) Foreign Application Priority Data

Mar. 8, 2002    (JP)    ............................ 2002-063493

(51) Int. Cl.
*F16D 31/02*    (2006.01)
(52) U.S. Cl. ............................ 60/403; 60/468; 180/423
(58) Field of Classification Search .................. 60/403, 60/468; 180/423
See application file for complete search history.

(56) References Cited

U.S. PATENT DOCUMENTS 4,267,897 A * 5/1981 Takeshima ................... 180/423

FOREIGN PATENT DOCUMENTS

| JP | 55-102744 | 8/1980 |
|---|---|---|
| JP | 58-152663 | 9/1983 |
| JP | 61-101106 | 6/1986 |
| JP | 63-14075 | 1/1988 |
| JP | 63-154466 | 6/1988 |
| JP | 01-199081 | 8/1989 |
| JP | 03-074275 | 3/1991 |
| JP | 11-059451 | 3/1999 |
| JP | 2001-180507 | 7/2001 |

* cited by examiner

*Primary Examiner*—F. Daniel Lopez
(74) *Attorney, Agent, or Firm*—Rabin & Berdo, PC

(57) ABSTRACT

Provided are a hydraulic pump 7, an electromagnetic flow rate control valve 2 that controls the flow rate of hydraulic oil supplied from the hydraulic pump 7 to a power steering device PS, and a pressure compensating valve 4 that maintains a fixed pressure difference between upstream and downstream sides of the electromagnetic flow rate control valve 2 and bypasses an excess flow rate. The electromagnetic flow rate control valve 2 maintains a predetermined initial opening when a control current is zero, while an opening of the electromagnetic flow rate control valve decreases to become a minimum opening when the control current increases from zero, and the opening gradually becomes larger toward a maximum opening when a predetermined control current is exceeded.

2 Claims, 4 Drawing Sheets

FLOW RATE CONTROL DEVICE FOR POWER STEERING

TECHNICAL FIELD

The present invention relates to a flow rate control device provided with an electromagnetic flow rate control valve that controls flow guided to a power steering mechanism.

BACKGROUND ART

There are devices that are provided with an electromagnetic flow rate control valve in order to control the flow of hydraulic oil that is supplied to a power steering device of a vehicle.

A large power assist force becomes necessary when a vehicle is running in a low speed region, during steering wheel operation in a state where the vehicle is stopped, and the like. In this case, an opening of the electromagnetic flow rate control valve is made larger, and the flow rate of the hydraulic oil supplied to the power steering device is made larger.

In contrast, the opening of the electromagnetic flow rate control valve is made smaller when almost no assist force is necessary, such as when the vehicle is running at high speed. In this case, surplus hydraulic oil bypasses the electromagnetic flow rate control valve by a pressure compensation valve and escapes, aiming for a reduction in energy loss.

FIG. 4 is a graph that shows a relationship between a control current I of a conventional electromagnetic flow rate control valve and a flow rate Qc that is supplied to a power steering device. As shown in this graph, the flow rate supplied to the power steering device is set to decrease as the control current of the electromagnetic flow rate control valve increases.

Setting the valve opening to become larger when the control current of the electromagnetic flow rate control valve becomes smaller is done so that a large valve opening is maintained even for cases in which current cannot be supplied due to a fault or the like. The electromagnetic flow rate control valve thus maintains a large opening by a spring retention force when there is no control current, and hydraulic fluid supply to the power steering device is made possible, thus exhibiting power assistance. That is, a failsafe function can be maintained.

If the opening is set to become larger when the control current of the electromagnetic flow rate control valve is large, the opening will become smaller when the current cannot be supplied due to damage or the like, and sufficient power assistance cannot be achieved.

However, if a large current is supplied to a solenoid of the electromagnetic flow rate control valve, electric power consumption also increases. Moreover, a state where the solenoid of the electromagnetic flow rate control valve is excited by a large current is a state where the power assist force of the power steering device is not necessary, that is, a standby state. This type of state accounts for most of the time when the vehicle is running.

Accordingly, the total energy consumption by the electromagnetic flow rate control valve becomes large with conventional techniques.

An object of this invention is to provide a flow rate control device capable of maintaining a failsafe function while further reducing energy loss.

DISCLOSURE OF THE INVENTION

The present invention relates to a flow rate control device for power steering, comprises a hydraulic pump, an electromagnetic flow rate control valve that controls the flow rate of hydraulic oil supplied from the hydraulic pump to a power steering mechanism, and a pressure compensation valve that maintains a fixed pressure difference between upstream and downstream sides of the electromagnetic flow rate control valve and bypasses an excess flow rate. The electromagnetic flow rate control valve maintains a predetermined initial opening when a control current is zero, while an opening of the electromagnetic flow rate control valve decreases to become a minimum opening when the control current increases from zero, and the opening afterward gradually becomes larger toward a maximum opening when a predetermined control current is exceeded.

Accordingly, when a power steering assist force is almost unnecessary, such as when a vehicle is running at high speed, the electromagnetic flow rate control valve takes on a minimum opening, an intermediate value current that is not too large is supplied, and consequently the power consumption of a solenoid can be kept small. Further, in this state, a small amount of hydraulic fluid is supplied from the hydraulic pump to the power steering mechanism. A residual excess flow rate returns from upstream of the electromagnetic flow rate control valve, via the pressure compensation valve, and the energy loss can be made smaller.

In a region where power assistance is necessary, such as when the vehicle running state is from low speed to intermediate speed, a control current is supplied in a wide control range from a minimum opening of the electromagnetic flow rate control valve to a maximum opening of the electromagnetic flow rate control valve. A proportional flow rate control having good precision can thus be performed according to the control current.

In the case where the control current is not supplied to the electromagnetic flow rate control valve due to a fault or the like, the electromagnetic flow rate control valve maintains a predetermined initial opening. Oil discharged from the hydraulic pump can be supplied to the power steering mechanism even in such a case, power assistance can be performed, and steering wheel operations can be prevented from becoming heavy.

BEST MODE FOR CARRYING OUT THE INVENTION

Figure 1:
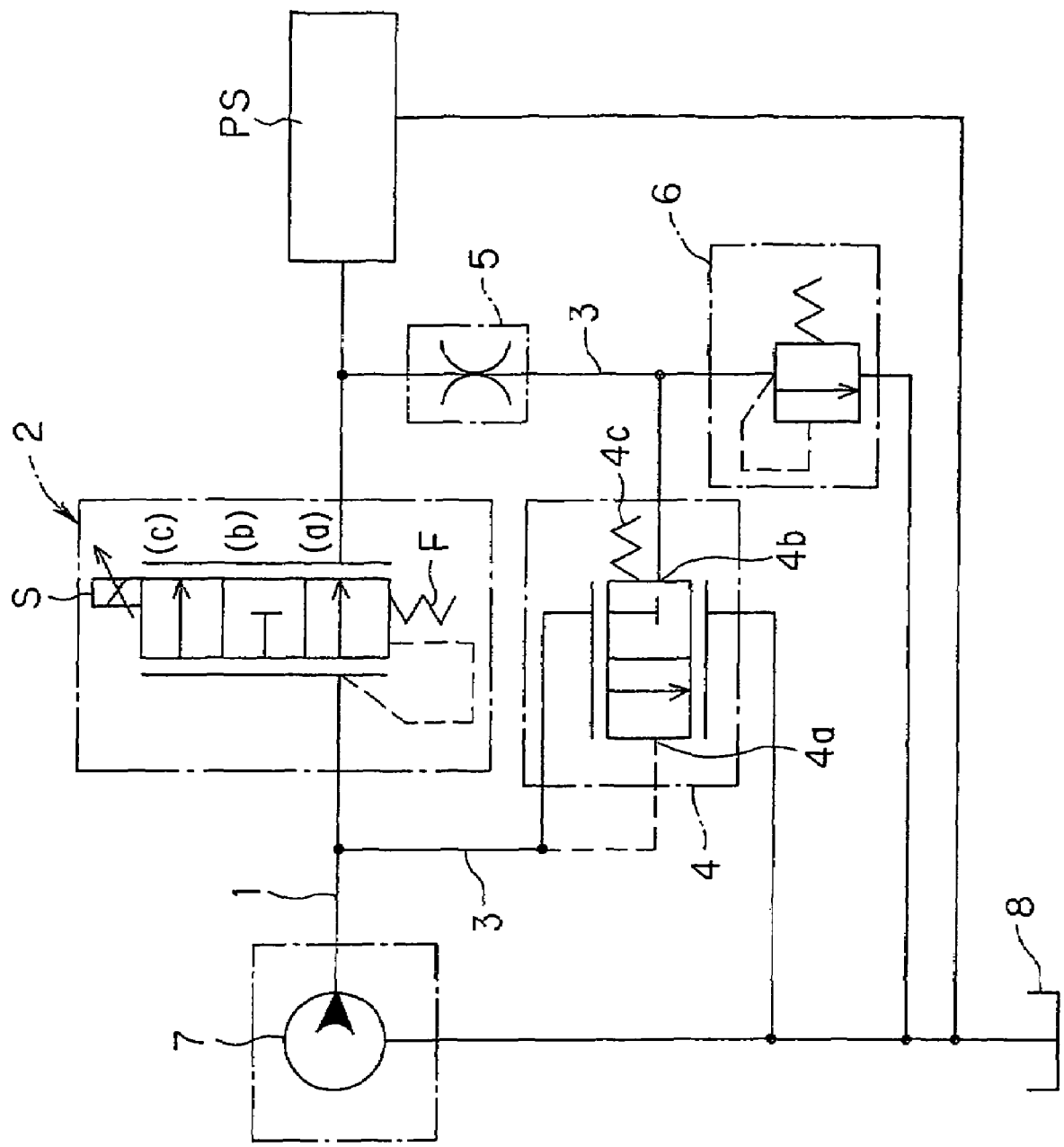
FIG. 1 is a circuit diagram of an embodiment of the present invention.

As shown in FIG. 1, a discharge side of a hydraulic pump 7 is connected to an electromagnetic flow rate control valve 2 through a supply flow path 1. Then, a power steering mechanism PS is connected to a downstream side of the electromagnetic flow rate control valve 2.

Further, a branch flow path 3 that branches off from upstream of the electromagnetic flow rate control valve 2 is provided to the supply flow path 1. A pressure compensation valve 4 is connected to the branch flow path 3 in order for the excess flow rate to bypass a reservoir 8. Pressure on the upstream side of the electromagnetic flow rate control valve 2 is introduced to one pilot chamber 4a of the pressure compensation valve 4, and further, pressure downstream of the electromagnetic flow rate control valve 2 is introduced to another pilot chamber 4b, through an orifice 5. The pressure compensation valve 4 operates in response to a pressure difference between those two pressures, and a spring force of a spring 4c. A bypass flow rate increases when the pressure difference becomes larger, and the bypass flow rate decreases when the pressure difference becomes smaller. The pressure upstream of the pressure compensation valve 4 can be maintained higher than a load pressure on the power steering mechanism PS by an amount that corresponds to the spring force of the spring 4c. A flow rate that is proportional to the opening of the electromagnetic flow rate control valve 2 can thus be supplied to the power steering mechanism PS even if the load on the power steering mechanism PS fluctuates. It should be noted that reference symbol 6 in the drawings denotes a relief valve that functions as a safety valve.

The electromagnetic flow rate control valve 2 maintains a predetermined initial opening shown in the drawings, that is, an open position (a), according to an elastic force of a spring F when a proportional solenoid S of the electromagnetic flow rate control valve 2 is in a non-excited state, that is, when the control current is zero. When the control current is increased from this state, the excitation force of the proportional solenoid becomes stronger, and the opening of the electromagnetic flow rate control valve 2 becomes smaller. The opening is maintained at its smallest value when the control current reaches a standby current Is, becoming a closed position (b) in this minimum opening state. The amount of hydraulic oil supplied to the power steering mechanism PS is thus minimize d. It should be noted that, although complete closure is shown in the drawings for the closed position (b), there is a certain amount of opening in practice, and a small amount of hydraulic fluid can flow.

On the other hand, when the control current is further increased from the standby state described above, the opening of the electromagnetic flow rate control valve 2 subsequently increases gradually up to the maximum opening according to the increase of the control current, and the electromagnetic flow rate control valve 2 is controlled at a proportional open position (c).

Figure 2:
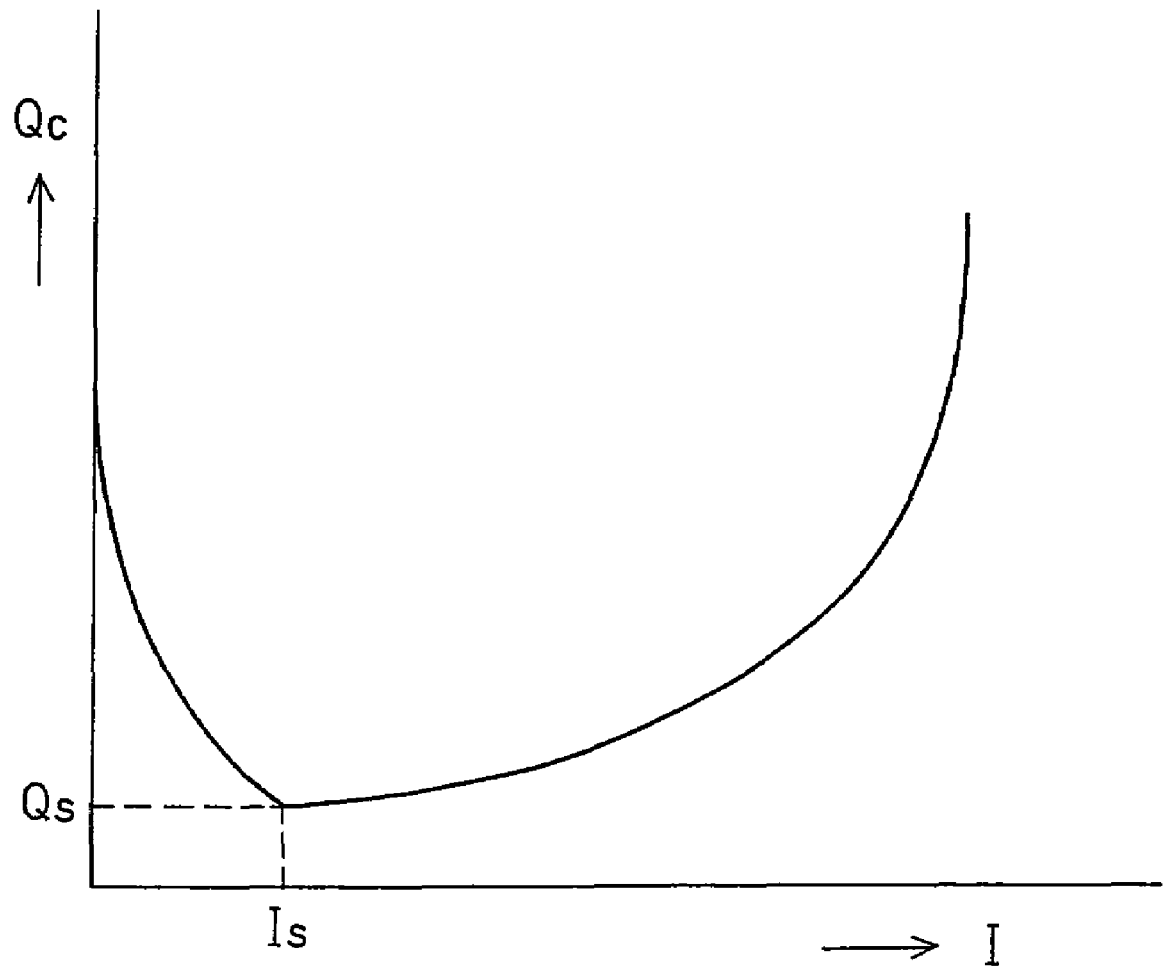
FIG. 2 is a graph showing a relationship between a control current I and a control flow rate Qc.

FIG. 2 is a graph that shows a relationship between a control current I of the proportional solenoid S of the electromagnetic flow rate control valve 2 and a flow rate Qc that is supplied to a power steering mechanism PS.

As shown in this graph, the electromagnetic flow rate control valve 2 supplies a predetermined large flow rate to the power steering mechanism PS side in the initial opening when the control current supplied to the proportional solenoid S is zero. The supply flow rate Qc decreases when the control current I is increased from a zero state. When the control current I becomes the standby current Is, the flow rate supplied to the power steering mechanism PS decreases to a minimum value. That is, the flow rate becomes a standby flow rate Qs.

In addition, when the control current I is increased from the standby state described above, the flow rate supplied to the power steering mechanism PS again increases gradually.

A range from where the control current I is zero to the control current Is of the standby state is large compared to a range from the control current Is to the maximum current. Accordingly, the proportional control precision of the flow rate with respect to the current value increases by using a control current equal to or greater than the control current Is when a normal power assist is necessary. The electromagnetic flow rate control valve 2 can thus maintain a high control performance, in other words, a high resolution.

For cases when a vehicle is running at a high speed region, that is, for cases in which almost no assist force of the power steering mechanism PS is required, a controller that is not shown in the drawings sets the control current I of the proportional solenoid S to the standby current Is. The control flow rate of the electromagnetic flow rate control valve 2 becomes a minimum.

In this state, a small amount of hydraulic oil is supplied from the hydraulic pump 7 to the power steering mechanism PS. The residual excess flow rate returns from upstream of the electromagnetic flow rate control valve 2 to the reservoir 8 through the pressure compensation valve 4. The energy loss can therefore be reduced compared to a case where a large flow rate is supplied to the power steering mechanism PS.

Moreover, the electric power consumed by the electromagnetic flow rate control valve 2 in the standby state can also be made smaller because the control current Is that maintains this standby flow rate is sufficient at a level equal to or less than half that of the conventional technique.

Furthermore, heat generated by the proportional solenoid S can also be reduced because the control current of the standby state is made smaller. Deterioration due to heat in parts around the proportional solenoid S can thus also be prevented, product quality can be maintained over a long period of time, and further, reliability can be increased When a power assist is necessary in a low speed or intermediate speed range of the vehicle, a control current that is larger than the standby control current Is controls the electromagnetic flow rate control valve 2. Thus, the control flow rate of the electromagnetic flow rate control valve 2 becomes larger, and the power assist force generated by the power steering mechanism PS becomes larger. Therefore, steering operations can be made lighter.

In this control current range, the proportional control precision of the control flow rate with respect to the control current increases, and a high control function can be maintained as the electromagnetic flow rate control valve 2.

On the other hand, when the control current is not supplied to the electromagnetic flow rate control valve 2 due to damage or the like, the electromagnetic flow rate control valve 2 maintains the open position (a) by an elastic force of a spring 21. Therefore, oil discharge from the hydraulic pump 7 can be supplied to the power steering mechanism PS even in this case, power assistance can be performed, and steering operations can be prevented from becoming heavy.

That is, while the failsafe mechanism is maintained according to the invention, and the power consumption in the standby state can also be reduced.

Figure 3:
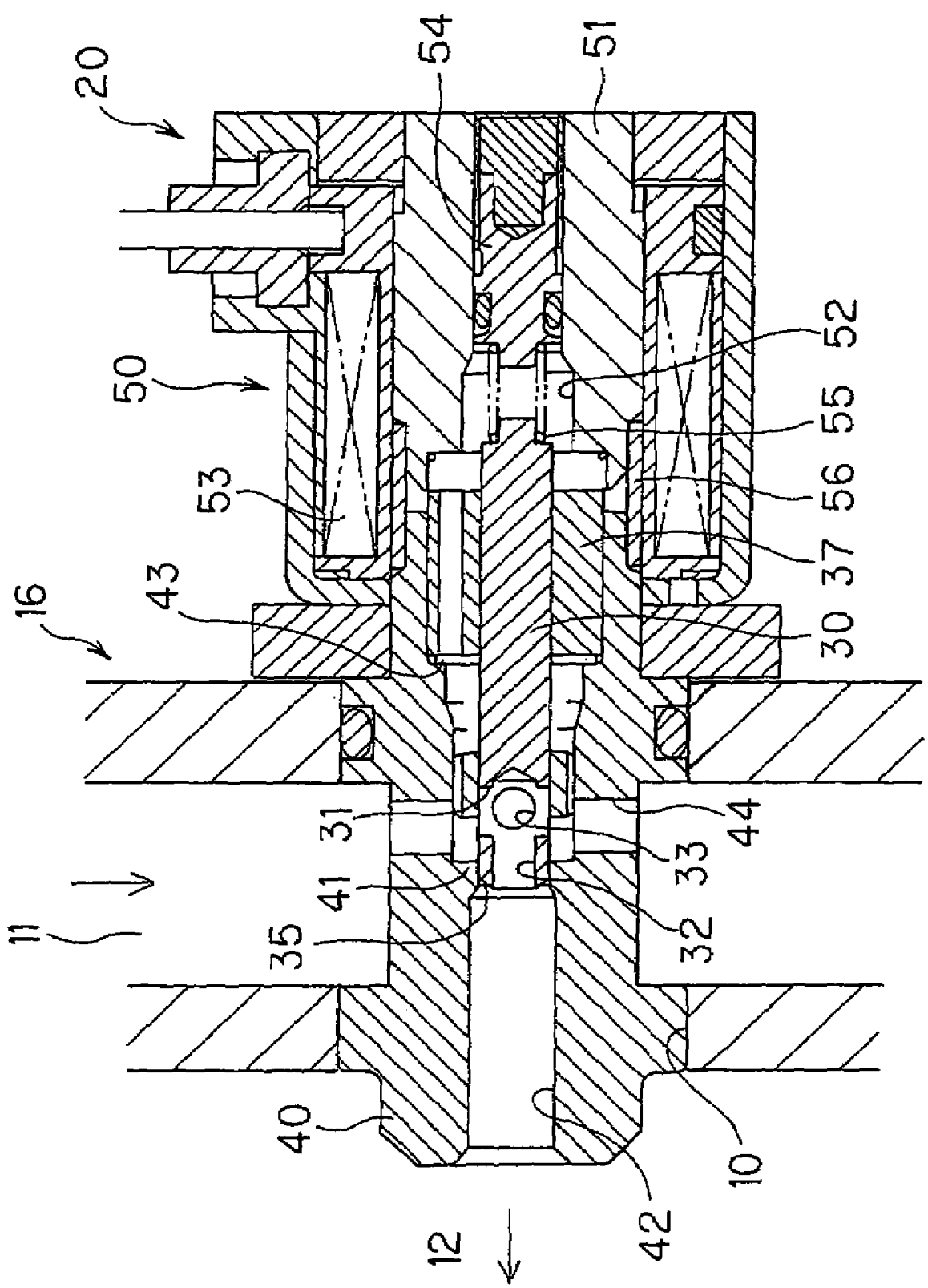
FIG. 3 is a cross sectional view of an electromagnetic flow rate control valve.
Figure 4:
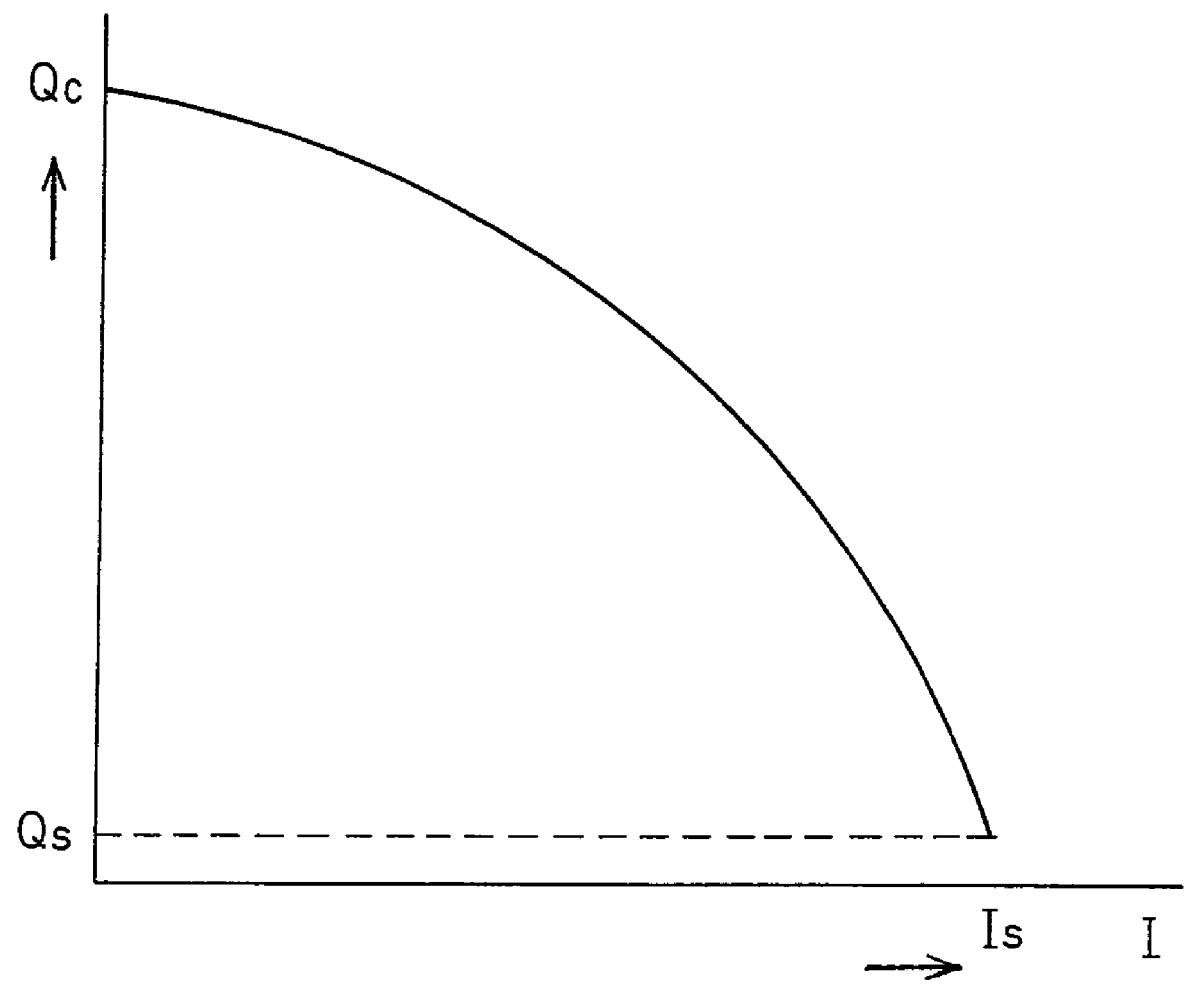
FIG. 4 is a graph showing a relationship between the control current I and the control flow rate Qc in a conventional technique.

FIG. 3 shows a specific structure of the electromagnetic flow rate control valve 2 of FIG. 1.

An assembly hole 10 is formed in a flow rate control valve main body 16. A sleeve 40 having a hollow portion 42 is inserted into the assembly hole 10 and fixed. The hollow portion 42 extends in a shaft center direction, passing through the sleeve 40. A hole 44 that communicates with the hollow portion 42 from a radial direction is formed in the sleeve 40. The hole 44 is connected to an upstream side flow path 11 that is formed in the main body 16, and an opening portion at one end of the hollow portion 42 communicates with a downstream side flow path 12.

Of the flow paths 11 and 12, the upstream side flow path 11 is connected to the hydraulic pump 7 shown in FIG. 1, and the downstream side flow path 12 is connected to the power steering mechanism PS.

A coil assembly 50 is coupled to a portion of the sleeve 40 that protrudes further than the main body 16. A base tubular member 51 of the coil assembly 50 is coupled to the sleeve 40 through a filler ring 56. A hollow portion 52 of the base member 51 and the hollow portion 42 of the sleeve 40 are communicated with each other.

A shaft 30 is slidably disposed within the hollow portions 42 and 52 of both members. A bearing 31 that is fixed to an inner circumferential surface of the hollow portion 42 movably supports the shaft 30 in the axial direction.

A leading end side of the shaft 30 faces the hollow portion 42 of the sleeve 40, and a plunger 37 is fixedly fitted into an outer circumference of a trailing end side of the shaft 30.

A spring 55 interposes between the trailing end side of the shaft 30 and an adjuster 54 that is incorporated into a center portion of the base member 51.

An end portion of the plunger 37 is moved by an elastic force of the spring 55 acting on the shaft 30 until the plunger 37 contacts a step portion 43 of the hollow portion 42 of the sleeve 40, thus maintaining an initial position of the shaft 30.

A tapered surface 35 is formed on a leading end of the shaft 30. As shown in the drawings, a cylindrical sheet portion 41 that is formed in the sleeve 40 is then blocked in a state where the leading end of the shaft 30, in which the tapered surface 35 is formed, is inserted in the sheet portion 41.

However, a hole 32 is formed in the leading end in the shaft 30, opening a portion of the leading end. A plurality of lateral holes 33 that are connected to the hole 32 from the radial direction are provided. The lateral holes 33 are connected to the hole 44 of the sleeve 40 in the state shown in the drawings. The upstream side flow path 11 and the downstream side flow path 12 are thus communicated via the hole 32 and the lateral holes 33.

A coil 53 is provided in an outer circumference of the base member 51 in order to constitute the proportional solenoid S. The shaft 30 is in the initial position shown in the drawings when a control current supplied to the coil 53 is zero. When the control current is supplied to the coil 53, the plunger 37 is resisted by the spring 55 in proportion to the intensity of the control current, and is pulled to the base member 51 side. Accordingly, the shaft 30 also moves in a rightward direction in the drawings along with the plunger 37.

When the shaft 30 thus moves in the rightward direction from the state shown in the drawings, the bearing 31 blocks opening portions of the lateral holes 33 of the shaft 30. Further, the leading end side of the shaft 30 passes out of the sheet portion 41 at this point.

The bearing 31 blocks the opening portions of the holes 33 of the shaft 30 immediately after the leading end of the shaft 30 passes out of the sheet portion 41.

When the opening portions of the lateral holes 33 are thus blocked by the bearing 31, the upstream side flow path 11 and the downstream side flow path 12 are in a communicated state through a slight gap between the tapered surface 35 of the shaft 30 and the sheet portion 41. This state is the standby state, and the standby flow rate Qs shown in FIG. 2 is supplied to the downstream side flow path 12. Furthermore, the control current that is supplied to the proportional solenoid S at this point is set to become Is.

When the shaft 30 moves further toward the rightward direction from the state described above, the tapered surface 35 passes completely out of the sheet portion 41. Subsequently, the flow rate that is proportional to a communicated area that is controlled by the leading end of the shaft 30 and the sheet portion 41 is thus supplied to the power steering mechanism PS through the downstream side flow path 12.

That is, the flow rate is controlled by the lateral holes 33 in a range where the control current is from zero to the standby current Is, but when the control current becomes equal to or larger than the standby current Is, the flow rate is controlled by the sheet portion 41 and the leading end of the shaft 30.

In a range where power assistance is necessary, such as when the running state of a vehicle is from low speed to intermediate speed, a control current equal to or greater than the standby current Is is supplied to the electromagnetic flow rate control valve 2. Proportional control of the flow rate between the sheet portion 41 and the leading end of the shaft can thus be performed with good precision according to the control current.

The invention is not limited to the interpretations provided by the embodiments described above, and various changes and improvements may of course be made within the technical scope of the invention as described in the claims.

INDUSTRIAL APPLICABILITY

The flow rate control device of the invention can perform flow rate control that corresponds to an operation state by applying the flow rate control device to a power steering device of a vehicle.

The invention claimed is:

1. A flow rate control device for power steering, comprising:
   a hydraulic pump;
   an electromagnetic flow rate control valve that controls the flow rate of hydraulic oil supplied from the hydraulic pump to a power steering mechanism, the electromagnetic flow rate control valve including
      an upstream side flow path that communicates with the pump,
      a downstream side flow path that communicates with the power steering mechanism,
      a cylindrical sheet portion between the upstream side flow path and the downstream side flow path,
      a shaft having a leading end that is insertable into the sheet portion,
      a spring that urges the shaft toward the sheet portion,
      a guide flow path that communicates from a front end of the shaft toward an outside surface, and
      a proportional solenoid that resists the spring and applies a thrust force in an axial direction,
      wherein the upstream side flow path and the downstream side flow path communicate through the guide flow path in a state where the shaft is inserted into the sheet portion, while an opening portion on a side of the guide flow path is blocked when the shaft passes out of the sheet portion, and the upstream side flow path and the downstream side flow path are linked through a space between the sheet portion and the shaft; and
   a pressure compensation valve that maintains a fixed pressure difference between upstream and downstream sides of the electromagnetic flow rate control valve and bypasses an excess flow rate, wherein the electromagnetic flow rate control valve maintains a predetermined initial opening when a control current is zero, while an opening of the electromagnetic flow rate control valve decreases to become a minimum opening when the control current increases from zero, and the opening afterward gradually becomes larger toward a maximum opening when a predetermined control current is exceeded.

2. The flow rate control device for power steering according to claim 1, wherein the control current range for the electromagnetic flow rate control valve is set so that a range from the minimum opening to the maximum opening is larger than a range from the initial opening to the minimum opening.

* * * * *